(12) United States Patent
Welsch et al.

(10) Patent No.: US 6,220,653 B1
(45) Date of Patent: Apr. 24, 2001

(54) BODY COMPONENT ARRANGEMENT FOR A MOTOR VEHICLE

(75) Inventors: Frank Welsch, Schwülper; Conrad Oehlerking, Meine, both of (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/373,315

(22) Filed: Aug. 12, 1999

(30) Foreign Application Priority Data

Aug. 17, 1998 (DE) ................................................ 198 37 083

(51) Int. Cl.$^7$ ........................................................ B60J 7/00
(52) U.S. Cl. .......................... 296/188; 296/210; 296/191
(58) Field of Search .................................. 296/210, 191, 296/188

(56) References Cited

U.S. PATENT DOCUMENTS

| | | | |
|---|---|---|---|
| 1,600,531 | * 9/1926 | Bourgon | 296/210 |
| 1,745,352 | * 2/1930 | Blanch | 296/191 |
| 2,027,163 | * 1/1936 | Graebner | 296/210 |
| 2,090,459 | * 8/1937 | Paton | 296/191 |
| 3,036,670 | * 5/1962 | Jewell | 296/210 |
| 3,286,784 | * 11/1966 | Mariner | 428/138 |
| 3,427,068 | * 2/1969 | Keahn et al. | 296/210 |
| 3,635,519 | * 1/1972 | Foster et al. | 296/210 |
| 3,966,526 | * 6/1976 | Doerfling | 296/210 |
| 4,247,586 | * 1/1981 | Rochlin | 428/138 |
| 4,270,328 | * 6/1981 | Page et al. | 52/511 |
| 4,447,961 | * 5/1984 | Valat | 33/180 AT |
| 5,014,593 | * 5/1991 | Auyer et al. | 89/36.02 |
| 5,138,857 | * 8/1992 | Siegert | 72/19 |
| 5,366,177 | * 11/1994 | DeCoux | 244/201 |
| 5,525,026 | * 6/1996 | DeMonte et al. | 414/542 |
| 5,595,256 | 1/1997 | Mueller . | |
| 5,620,366 | * 4/1997 | Munzel et al. | 454/152 |
| 5,749,287 | * 5/1998 | Schouten | 99/458 |
| 5,823,600 | * 10/1998 | Iwao | 296/39.3 |
| 5,943,734 | * 8/1999 | Pearce | 16/31 A |
| 5,996,292 | * 12/1999 | Hill et al. | 52/202 |
| 6,068,328 | * 5/2000 | Gazdzinski | 296/185 |
| 6,155,634 | * 12/2000 | Oehlerking et al. | 296/210 |

FOREIGN PATENT DOCUMENTS

| | | |
|---|---|---|
| 574777 | 3/1933 | (DE) . |
| 692243 | 5/1940 | (DE) . |
| 2558332 | 7/1997 | (DE) . |
| 19732308 | 2/1998 | (DE) . |
| 633182 | 1/1995 | (EP) . |
| 2490572 | 3/1982 | (FR) . |

* cited by examiner

*Primary Examiner*—D. Glenn Dayoan
*Assistant Examiner*—Hilary Gutman
(74) *Attorney, Agent, or Firm*—Baker Botts L.L.P.

(57) ABSTRACT

A body component arrangement for a motor vehicle includes a body component having a specific shape which under the action of an applied force has different load and/or stress conditions within different regions of the body component including high load and/or stress conditions in a first region and lower load and/or stress conditions in a second region. A pattern of through holes is provided so that the through holes in the region of the lower load and/or stress conditions form a perforation pattern having a configuration arranged so that the load and/or stress conditions arising in that region under the action of an applied force will have a substantially uniform distribution. This produces a weight saving that is very economical and achieves a reduction of damage in the region of lower load and/or stress conditions.

31 Claims, 4 Drawing Sheets

BODY COMPONENT ARRANGEMENT FOR A MOTOR VEHICLE

BACKGROUND OF THE INVENTION

The invention relates to body component arrangements for motor vehicles in which the body component has a specific shape, and in which, because of the specific shape, various load and/or stress conditions occur under applied forces in various portions of the body component, in particular high load or stress conditions in a first portion and low load or stress conditions in a second portion.

In the prior art there are known body components that are produced by forming in various ways, usually from metal plates. These variously configured body components, depending on the particular specific component, are provided with a specific shape and a corresponding thickness of material so that they can absorb the forces acting upon them. The thickness of the material of each specific body component may vary in different portions of the component, depending on the applied load and/or stress conditions to be expected. Accordingly, in regions of high load and/or stress conditions, a far greater thickness of material is provided than in regions with lower load and/or stress conditions.

It is known, especially outside the motor vehicle technology, that components, preferably of sheet-like configuration having a different thickness of material in different regions, may be produced by the "tailored blank" technique to produce a reduction of weight. In these component arrangements, different metal elements, generally made of metal sheets and having various structural arrangements and sheet-metal thicknesses, are combined with each other in such a manner that a part of the desired specific shape is formed which has a different wall thickness or thickness of material in correspondingly different regions because of the different metal sheets and different sheet-metal thicknesses used. In addition, parts with differing wall thicknesses may also be produced by costly methods such as pressure casting.

Structural elements to be separately arranged such as disclosed in European Published Application No. 0 633 182 are fabricated in perforated sheets or steel mesh and fastened for example to the inside of vehicle doors or hoods to enhance the mechanical strength or rigidity of a vehicle door. These structural elements are bonded to the corresponding portions of a vehicle door or connected to the sheet metal of the vehicle door by cold forming.

Additional prior art relating to this subject matter is found in German Patents Nos. 574,777 and 692,243.

The prior art methods and the production of the corresponding specific parts, in particular by the "tailored blank" technique, are very expensive, depending on the nature of the specific parts to be produced, since a thin sheet must be thickened locally. Consequently, parts produced in this manner are extremely cost-intensive. Another disadvantage of the prior art is that, while a correspondingly small thickness of material is provided in the region of a lower load and/or stress condition, this reduced thickness of material does not always ensure that the load and/or stress condition occurring in that region will be substantially uniform under the action of an applied force because the load or stress condition is dependent on various factors such as the point of application of a force, the specific shape of the component, the structural arrangement of the metal, etc. A non-uniform load and/or stress condition in a region having a smaller thickness of material may in any event lead, especially over any long period of time under load, to cracks, elongations or even failure of or damage to that region. As a result, not only is the production of such parts very cost-intensive on the one hand, the parts are not always optimal on the other hand.

SUMMARY OF THE INVENTION

Accordingly, it is an object of the present invention to provide a body component arrangement for a motor vehicle which overcomes disadvantages of the prior art.

Another object of the invention is to provide a body component arrangement by which an optimal saving of waste is made possible while reducing the component cost and liability to damage.

These and other objects of the invention are attained by providing several through holes in a perforation pattern of a certain kind in the region of lower load and/or stress condition to reduce the material in the body component in such a way that the load and/or stress condition produced in this region under the action of an applied force will have a substantially uniform configuration. By providing this body component arrangement, first the cost is reduced since suitable through holes may be produced very economically, and second a load and/or stress condition of substantially uniform configuration under the action of an applied force in the region of lower load and/or stress conditions is made possible by the specific pattern of perforations. As a result of the uniform configuration of the load and/or stress condition thus achieved, there will be fewer cracks or other damage, even over a load application of long duration, so that the liability to damage of the component is also reduced. Consequently, a body part is obtained that achieves the required saving of weight because of the through holes while being economical and having a minimized liability to damage.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
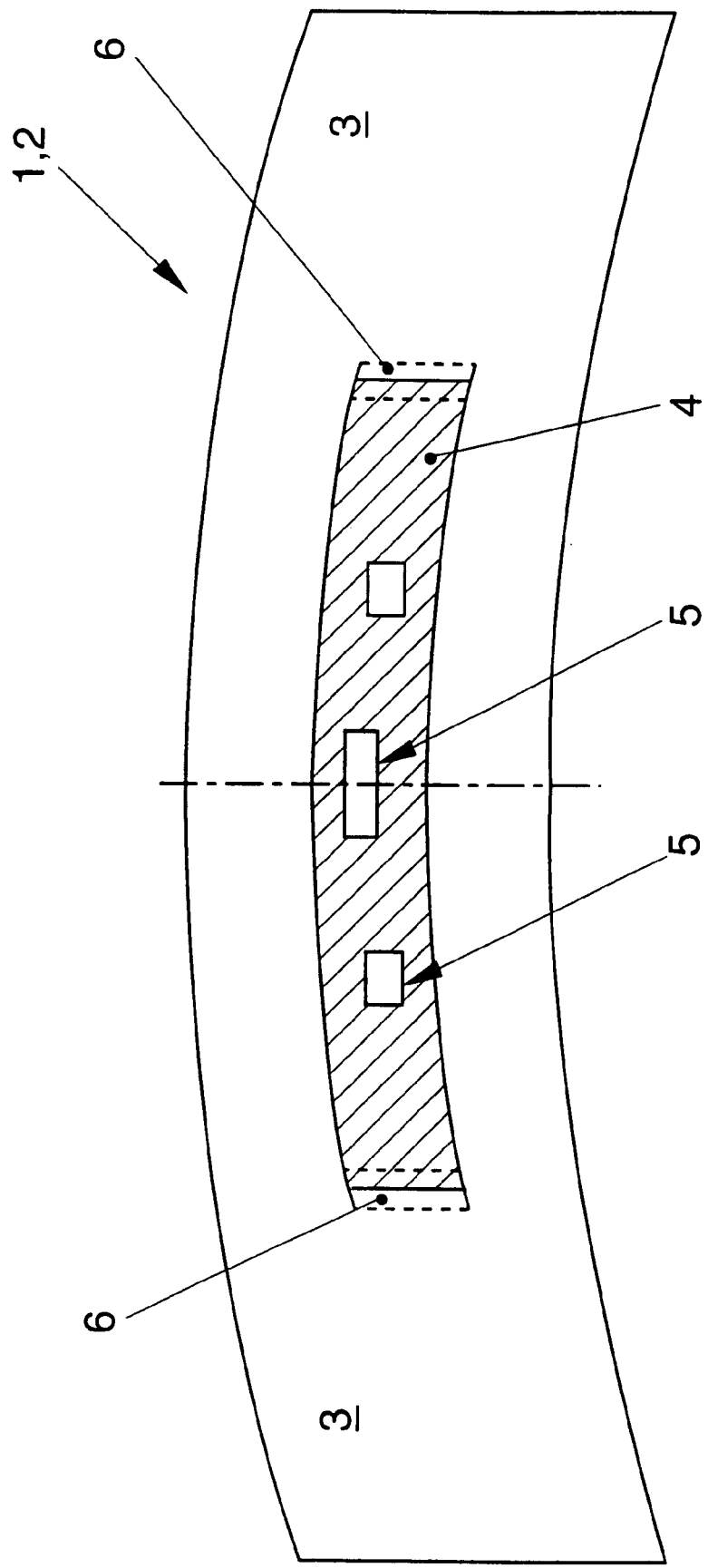
FIG. 1 is a schematic plan view illustrating a representative embodiment of a metal sheet in unformed condition for a body component constituting a front roof cross member.
Figure 2:
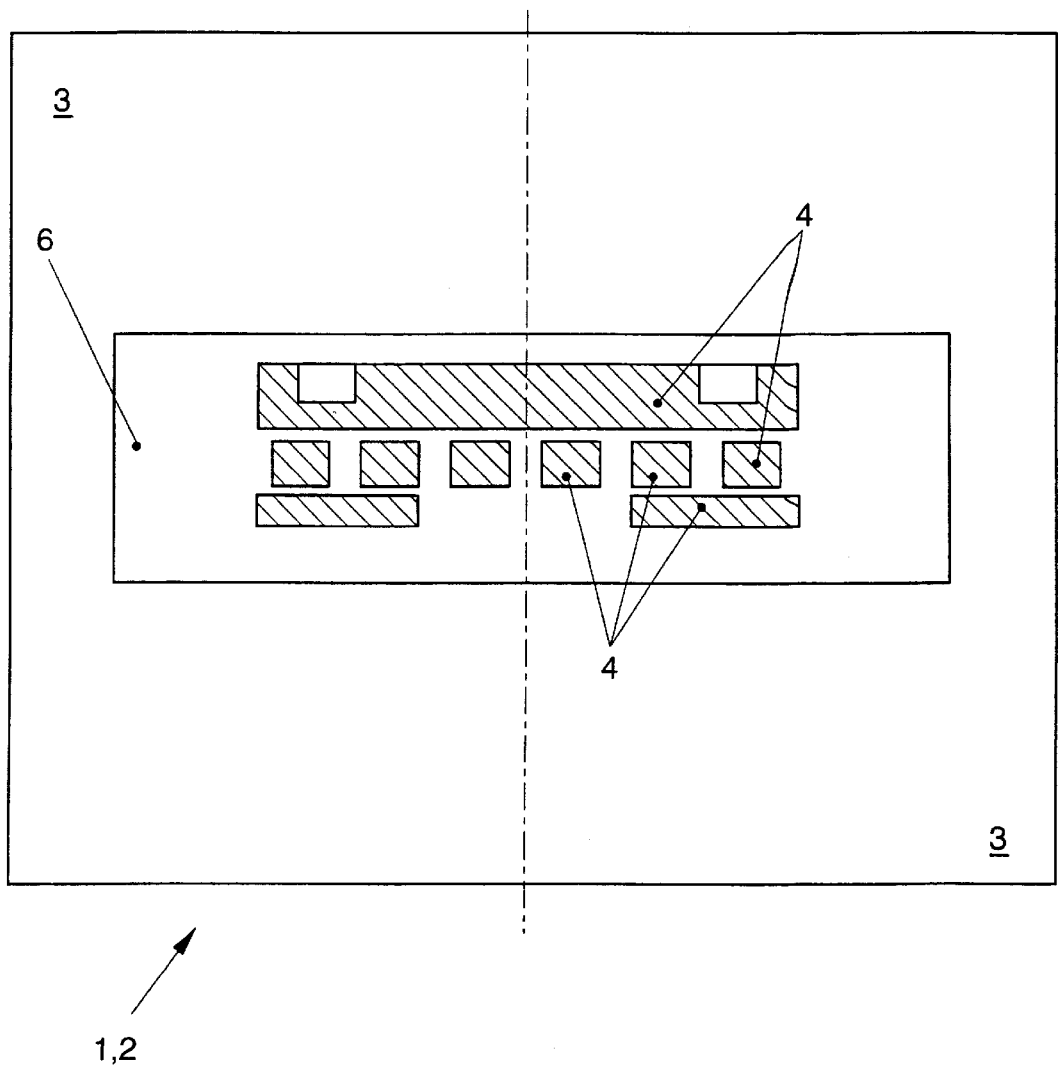
FIG. 2 is a schematic plan view showing a representative embodiment of a metal sheet in unformed condition for a body component constituting a rear roof cross member.
Figure 3:
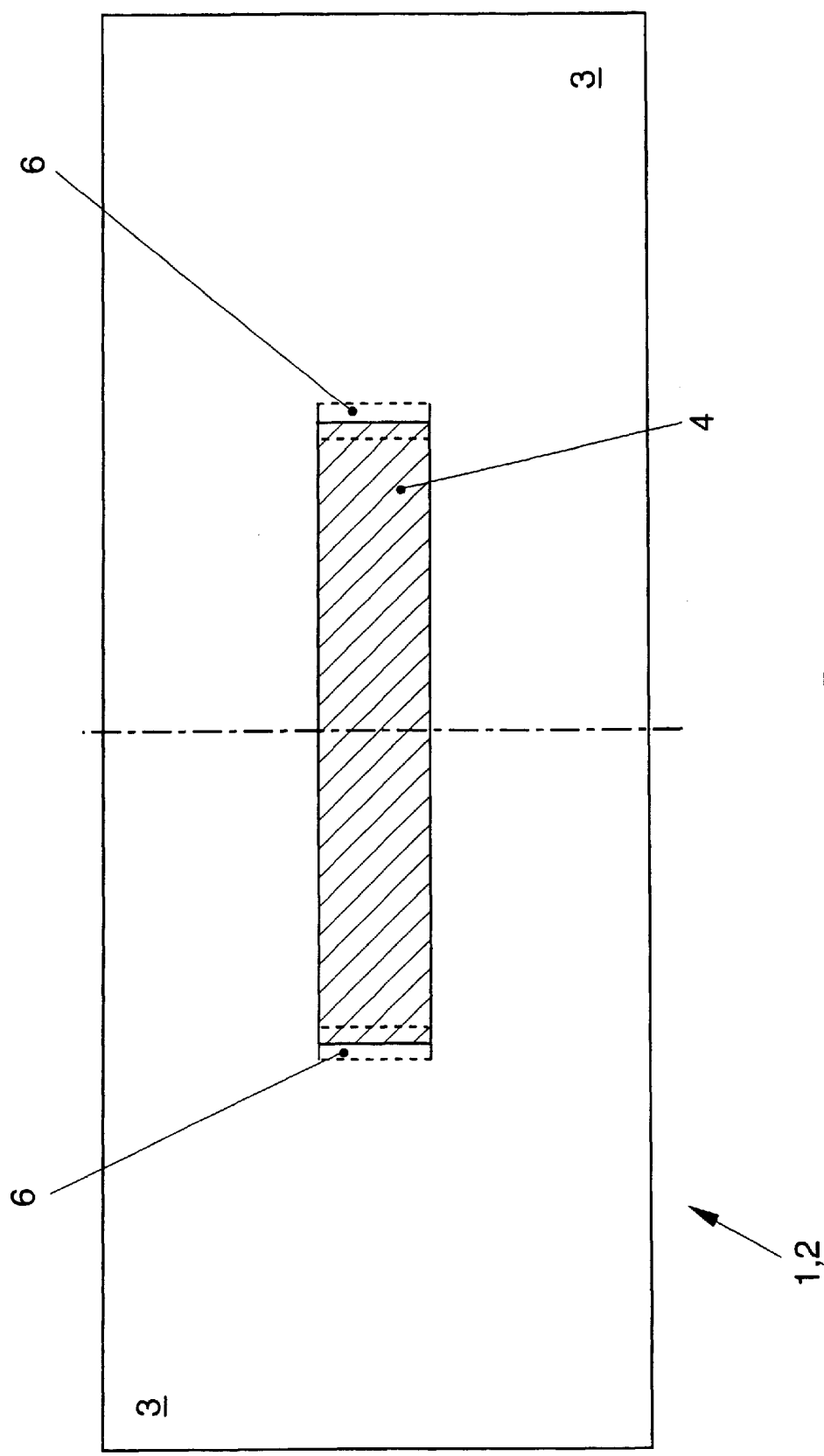
FIG. 3 is a schematic plan view showing a representative embodiment of a metal sheet in unformed condition for a body component constituting an inner cross member.

FIGS. 1–3 show typical embodiments of metal sheets 1 in as yet unformed condition for various body components 2 for the body of a motor vehicle. The body component 2 produced by a particular metal sheet 1 has a specific final shape, on the basis of which different load and/or stress conditions exist in response to an applied force within different regions 3 and 4 of the body component 2, for example, high load and/or stress conditions in a first region 3 and low load or stress conditions in a second region 4. These regions 3 and 4 within the as yet unformed metal sheets shown in FIGS. 1 to 3 will become the region 3 of high load and/or stress conditions and the region 4 of low load and/or stress conditions in the later formed condition of the corresponding metal sheet 1, that is, when the finished body component 2 has its particular specific shape.

In accordance with the invention, the disadvantages described above are avoided, i.e., a weight reduction is economically achieved and the liability to damage of the region 4 of a low load and/or stress condition is minimized, because through holes made in the region 4 of low load and/or stress condition to reduce the material in the body component 2, and the through holes in the region 4 of lower load and/or stress condition form a pattern of perforations arranged so that the load and/or stress condition occurring in the region 4 under the action of an applied force will have a substantially uniform distribution.

Figure 4:
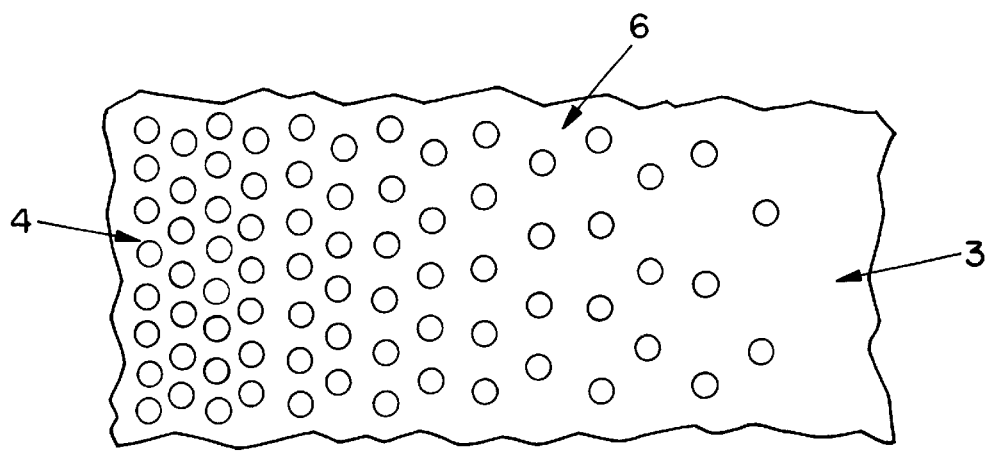
FIG. 4 is a schematic fragmentary view illustrating a gradual transition of a perforation pattern from a region of lower load and/or stress condition to a region of higher load and/or stress condition.
Figure 5:
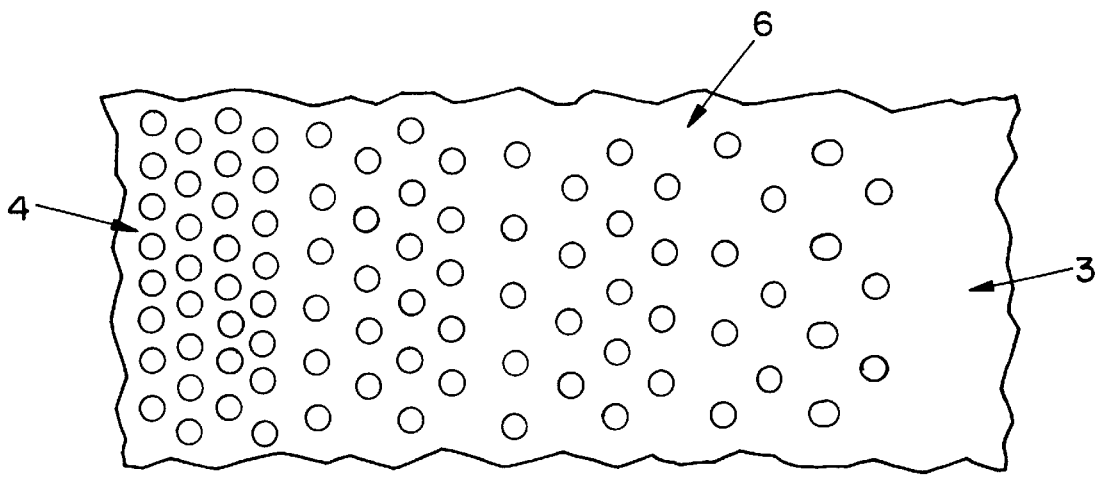
FIG. 5 is a schematic fragmentary view illustrating a stepwise transition of a perforation pattern from a region of lower load and/or stress condition to a region of higher load and/or stress condition.

Although the illustrations of the metal sheets 1 in FIGS. 1–3 do not show any individually represented or more closely defined through holes but show substantially only a shaded region 4 in which the correspondingly low load and/or stress conditions occur in response to application of a force, the arrangement and configuration of the through holes as well as the perforation pattern determined by them in the region 4 as shown in FIGS. 4 and 5 and will be discussed in more detail hereinafter. At this point some fundamental advantages to be gained by the configuration of such a corresponding perforation pattern will be discussed.

In the first place, by providing an appropriate configuration or arrangement of the pattern of perforations in a transition region 6, a gradual transition may be made from a region 3 of higher load and/or stress condition having no perforations or few perforations to a region 4 of lower load and/or stress condition having more perforations as shown in FIG. 4. In this case, the body component 2 has a substantially uniform thickness of material throughout and is made of sheet metal, such as the metal sheets 1 shown in FIGS. 1 and 3, preferably by a cold forming operation.

The diameter of the through holes, which are substantially round, and the spacing of the through holes from each other, is matched to the load and/or stress condition to be expected in the corresponding region so that the load and/or stress condition in the region 4 resulting from the action of a force will be substantially uniform.

Because of the flexibility of the arrangement, i.e., the possible formation of different perforation patterns or the production of additional holes in the transition region 6 between the region 3 of higher load and/or stress conditions to the region 4 of lower load and/or stress condition, and the variation in hole density, i.e., the hole area/total area of the perforation pattern in the transition region 6 in proportion to the hole density of the perforation pattern of the region 4 of the lower load and/or stress condition, a gradual transition as shown in FIG. 4, or, alternatively a stepwise transition as shown in FIG. 5, can be achieved according to a desired preference or depending upon the configuration of the particular specific body component 2.

FIG. 1 shows an as yet unformed metal sheet 1 to be formed into a body component 2 constituting a front roof cross member for a vehicle body. As shown in FIG. 1, the metal sheet 1 has a curved configuration. In this arrangement, the metal sheet 1 has a width of about 280 mm and a length of about 1210 mm and the shaded region 4 represents a region of lower load and/or stress condition. It is readily apparent that, within the shaded region 4, additional openings 5 are provided so that other components may be mounted or received in the component formed by metal sheet 1, that is, when the metal sheet 1 has been formed into a front roof cross member. The diameter of the through holes, which are not shown individually, is between about 3 and 5 mm, preferably about 4 mm, and the through holes are provided along rows which are staggered in relation to each other.

The spacing of the adjacent through holes in each row, i.e., the distance from the center of a through hole to the center of the adjacent through hole in the same row is preferably about 4 to 10 mm, desirably 7 mm. The thickness of the metal sheet 1 in this embodiment, referred to also as the base sheet, is preferably 1.0 mm. The metal sheet 1 or base sheet ($FePO4$) shown in FIG. 1 is a hot-galvanized sheet steel with an arcuate section, the arcuate section also containing the perforation pattern and/or the shaded region 4. Because of the perforation pattern, a reduction of the sheet material by from about 22.5% to about 30% can be obtained in the region 4.

In the preferred embodiment, the diameter of the through holes is about 4 mm and the hole spacing is about 7 mm so that about 30% of the sheet material is punched out, leaving an equivalent sheet metal thickness, i.e., an average thickness of the metal sheet 1, of about 0.7 mm in the region 4.

As mentioned above, the perforation pattern is interrupted by openings 5 provided for the attachment of components such as sunshades. In the case of a front roof cross member made out of a metal sheet 1, there is a weight saving of about 75 g, equivalent to 7%, and in this case possible different configurations of the patterns of perforation makes possible a weight saving of from about 5% to about 10%. FIG. 1 also shows in dotted lines the transition region 6, i.e., the region of transition from the region 3 of the high load and/or stress conditions to the region 4 of low load and/or stress conditions, where the pattern of perforations "fades", that is, the hole density varies correspondingly to provide a suitable, preferably gradual transition of the stress patterns.

FIG. 2 shows a metal sheet 1 from which, in its later formed condition, rear roof cross member for a vehicle body is formed as a body component 2. The metal sheet 1, shown in its unformed condition, contains several regions 4 of lower load and/or stress conditions which are shown as shaded. In a preferred embodiment, the metal sheet 1 is galvanized on both sides and is about 1100 mm in length and about 900 mm in width. The diameter of the through holes, shown in FIGS. 4 and 5, which are provided in the shaded region 4, is about 3.5 or 4 mm. As in the arrangement of FIG. 1, the rows of perforations are offset from each other, that is, a through hole of one row is laterally offset and located substantially in line with the center between two adjacent through holes of an adjacent row. If the through holes are about 3.5 mm in diameter, the hole spacing of the adjacent through holes in one row is preferably about 6 mm, and, if the through holes are about 4 mm in diameter, the spacing is preferably about 7 or 8 mm. The metal sheet 1 shown in FIG. 2 is preferably about 0.8 mm in thickness. As a result of the perforation pattern in this region, as described above, a reduction of metal by from about 22.5% to about 30.5% can be achieved. With a 4 mm diameter of the through holes and a hole spacing of about 8 mm, the result for the region 4 is an equivalent sheet thickness of about 0.6 mm, achieving a weight saving of about 100 g corresponding to about 7%.

Figure 6:
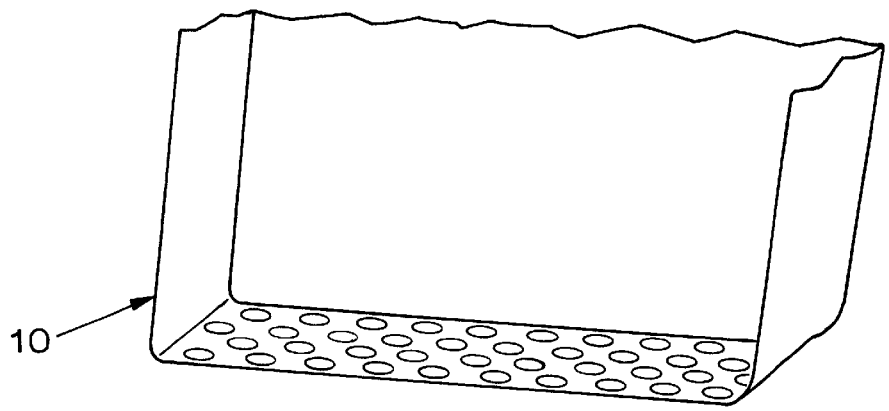
FIG. 6 is a schematic fragmentary illustration showing a web plate sill as a body component for a lower portion of a door of a motor vehicle.

It is also possible to produce a body component 2 that is arranged as a web plate sill, namely, a body component for the lower portion of a door 10, which is shown in FIG. 6 drawings. In the event that the body component 2 is a web plate sill, the diameter of the through holes is preferably about 4 mm, the through holes again being arranged in rows which are staggered with respect to each other. In this case, the spacing of the adjacent through holes in a row is preferably about 8 mm, and the thickness of the base sheet, or of the metal sheet, is preferably about 0.8 mm. As a result of the perforation pattern, a reduction of material by about 22.5% corresponding to an equivalent thickness of the metal sheet 1 in this region of about 0.6 mm can be obtained in the region of lower load and/or stress condition, corresponding to a weight saving of about 350 g or about 9%.

It is also possible to provide through holes having a different shape, for example, hexagonal through holes. In addition, body components 2, for example seat cross-members, supports for sealing passages, traverses between the rear wheel casings, interior trim parts or the like, may be made in this matter. Preferably, the through holes are made by a conventional technique, for example, with the aid of a punch and die of suitable configuration. In making the pattern of perforations, an attempt should be made to produce an approximately homogeneous pattern, so that a uniform load distribution may be achieved.

FIG. 3 shows a metal sheet 1 that may be formed into a body component 2 constituting an inner cross member that may be mounted in a vehicle body. Preferably, the metal sheet 1 of this embodiment is about 600 mm in width and about 1600 mm in length. As in FIGS. 1 and 2, the shaded region 4 of FIG. 3 represents the region where, in the later formed condition of the metal sheet 1, lower load or stress conditions occur. The diameter of the through holes, which are not individually shown, is preferably about 3.5 or 4 mm and the through holes are again provided in rows which are offset from each other. The spacing between the adjacent through holes in each row is preferably about 5.5 mm if the diameter of the through holes is about 3.5 mm, and is about 7 mm if the diameter of the through holes is about 4 mm. The thickness of the metal sheet 1 in this case, which again may be referred to as the base sheet, is preferably about 2 mm. As in the other embodiments, a transition region 6, in which the pattern of perforations thins out in the direction toward the high load and/or stress region, is shown in dotted lines. Because of the perforation pattern used in this embodiment a reduction of material of about 36% to 42% can be achieved in the region 4.

Although the invention has been described herein with reference to specific embodiments, many modifications and variations therein will readily occur to those skilled in the art. Accordingly, all such variations and modifications are included within the intended scope of the invention.

We claim:

1. A load-bearing body component arrangement for a motor vehicle comprising a body component having a specific shape in which, because of its shape, different load and/or stress conditions are produced in response to an applied force within different regions of the body component including high load and/or stress conditions in a first region and lower load and/or stress conditions in a second region, wherein the body component has a plurality of through holes formed in the region of lower load and/or stress conditions to reduce the amount of material in the component, the through holes in the region of lower load and/or stress conditions being formed in a pattern of perforations arranged so that the load and/or stress conditions occurring in the second region in response to the applied force will have a substantially uniform distribution, and wherein additional through holes are provided in a transition region between the region of high load and/or stress conditions and the region of lower load and/or stress conditions and wherein the perforation pattern in the transition region varies with respect to the perforation pattern in the region of lower load and/or stress conditions to provide a gradual transition which comprises a gradual change in hole density in order to provide a uniform stress-tension transition between the first region and the second region.

2. A load-bearing body component arrangement for a motor vehicle comprising a body component having a specific shape in which, because of its shape, different load and/or stress conditions are produced in response to an applied force within different regions of the body component including high load and/or stress conditions in a first region and lower load and/or stress conditions in a second region, wherein the body component has a plurality of through holes formed in the region of lower load and/or stress conditions to reduce the amount of material in the component, the through holes in the region of lower load and/or stress conditions being formed in a pattern of perforations arranged so that the load and/or stress conditions occurring in the second region in response to the applied force will have a substantially uniform distribution, and including additional through holes provided in a transition region between the region of high load and/or stress conditions and the region of lower load and/or stress conditions, and the perforation pattern in the transition region varies with respect to the perforation pattern in the region of lower load and/or stress conditions comprising decreasing hole density to provide a perceptible stepwise transition in order to provide a uniform stress-tension transition between the first region and the second region.

3. A body component arrangement according to claim 1 or claim 2 wherein the body component has a substantially uniform thickness of material throughout.

4. A body component arrangement according to claim 1 or claim 2 wherein the body component is made of metal sheets.

5. A body component arrangement according to claim 1 or claim 2 wherein the through holes are substantially round and have a spacing from each other which is selected according to an anticipated load and/or stress condition in the corresponding region.

6. A body component arrangement according to claim 1 or claim 2 wherein the body component constitutes a front roof cross member for a vehicle body.

7. A body component arrangement according to claim 6 wherein the diameter of the through holes is from about 3 mm to about 5 mm.

8. A body component arrangement according to claim 6 wherein the through holes are arranged in rows which are offset from each other.

9. A body component arrangement according to claim 6 wherein a spacing of adjacent through holes in each row is from about 4 mm to about 10 mm.

10. A body component arrangement according to claim 6 wherein the body component has a base sheet with a thickness of about 1.0 mm.

11. A body component arrangement according to claim 6 wherein, because of the perforation pattern in the lower stress and/or load region, a reduction of metal of about 22.5% and about 30% is obtained.

12. A body component arrangement according to claim 1 or claim 2 wherein the body component constitutes a rear roof cross member.

13. A body component arrangement according to claim 12 wherein the diameter of the through holes is in the range from about 3.5 mm to about 4 mm.

14. A body component arrangement according to claim 12 wherein the through holes are provided in rows which are offset from each other.

15. A body component arrangement according to claim 12 wherein a spacing of adjacent through holes in each row is about 6 mm.

16. A body component arrangement according to claim 12 wherein a spacing of adjacent through holes in each row is in the range from about 7 mm to about 8 mm.

17. A body component arrangement according to claim 12 wherein the body component has a base sheet with a thickness of about 0.8 mm.

18. A body component arrangement according to claim 12 wherein, because of the perforation pattern in the lower load and/or stress region, a reduction of material of from about 22.5% to about 30.5% is achieved.

19. A body component arrangement according to claim 1 or claim 2 wherein the body component constitutes a web plate sill for a vehicle door.

20. A body component arrangement according to claim 19 wherein the diameter of the through holes is about 4 mm.

21. A body component arrangement according to claim 19 wherein the through holes are provided in rows which are offset from each other.

22. A body component arrangement according to claim 19 wherein a spacing of adjacent through holes in each row is about 8 mm.

23. A body component arrangement according to claim 19 wherein the body component has a base sheet with a thickness of about 0.8 mm.

24. A body component arrangement according to claim 19 wherein, because of the perforation pattern in the lower load and/or stress region, a reduction of material of about 22.5% is achieved.

25. A body component arrangement according to claim 1 or claim 2 wherein the body component constitutes an inner cross member.

26. A body component arrangement according to claim 25 wherein the diameter of the through holes is from about 3.5 mm to about 4 mm.

27. A body component arrangement according to claim 25 wherein the through holes are provided in rows which are offset from each other.

28. A body component arrangement according to claim 25 wherein a spacing of adjacent through holes in a row is about 5.5 mm.

29. A body component arrangement according to claim 25 wherein a spacing of the adjacent holes in a row is about 7 mm.

30. A body component arrangement according to claim 25 wherein the body component has a base sheet with a thickness of about 2 mm.

31. A body component arrangement according to claim 25 wherein, because of the perforation pattern in the low load and/or stress region, a reduction of material in the range from about 36% to about 42% is achieved.

* * * * *